United States Patent
Pence et al.

(10) Patent No.: US 9,203,234 B2
(45) Date of Patent: Dec. 1, 2015

(54) FAULT DETECTION SYSTEM AND METHOD FOR A GENERATOR

(71) Applicant: Deere & Company, Moline, IL (US)

(72) Inventors: Jacob Pence, Dubuque, IA (US); Eric Vilar, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 252 days.

(21) Appl. No.: 13/751,216

(22) Filed: Jan. 28, 2013

(65) Prior Publication Data

US 2014/0211344 A1 Jul. 31, 2014

(51) Int. Cl.
 *H02P 1/00* (2006.01)
 *H02H 7/125* (2006.01)
 *H02H 7/06* (2006.01)

(52) U.S. Cl.
 CPC ............ *H02H 7/1252* (2013.01); *H02H 7/06* (2013.01); *Y02T 10/6286* (2013.01); *Y02T 10/7077* (2013.01)

(58) Field of Classification Search
 CPC . Y02T 10/7005; Y02T 10/7077; B60W 10/08
 USPC .......................................... 318/139, 727, 140
 See application file for complete search history.

(56) References Cited

U.S. PATENT DOCUMENTS

| | | | | |
|---|---|---|---|---|
| 4,229,687 A * | 10/1980 | Newman | | 320/112 |
| 4,542,462 A * | 9/1985 | Morishita et al. | | 701/1 |
| 5,617,011 A * | 4/1997 | Hammer et al. | | 322/28 |
| 6,098,735 A * | 8/2000 | Sadarangani et al. | | 180/65.24 |
| 7,459,914 B2 * | 12/2008 | Lindsey et al. | | 324/525 |
| 7,652,858 B2 * | 1/2010 | Tang et al. | | 361/33 |
| 8,108,160 B2 * | 1/2012 | Liu et al. | | 702/63 |
| 2012/0277942 A1 | 11/2012 | Vilar et al. | | |

FOREIGN PATENT DOCUMENTS

| | | |
|---|---|---|
| JP | 2003087996 A | 3/2003 |
| JP | 2006254692 A | 9/2006 |
| WO | WO2010073552 A1 | 7/2010 |

\* cited by examiner

*Primary Examiner* — Rina Duda

(57) ABSTRACT

An electric vehicle is provided having an electric generator and a motor. Generated electrical energy may be routed to a DC bus of an inverter system. The inverter system may be configured to provide the electrical energy to the motor. A controller may detect a fault based on the voltage level of the DC bus.

17 Claims, 4 Drawing Sheets

FAULT DETECTION SYSTEM AND METHOD FOR A GENERATOR

FIELD

The present disclosure relates to controlling an engine-driven generator of a vehicle, and more particularly to a system and method for detecting a phase-to-phase fault in an engine-driven generator of a vehicle.

BACKGROUND AND SUMMARY

Electric vehicles, such as hybrid vehicles or range extender vehicles, include one or more electric motors configured to drive a ground engaging mechanism of the vehicle. Electric vehicles typically include a generator driven by a prime mover, such as an engine, for generating electrical power used to drive the motor of the vehicle.

In some systems, electrical power from the generator is rectified and stored on a direct current (DC) bus for powering one or more loads on the vehicle, such as the electric motor. In some electric vehicles, the engine output is coupled to the generator such that the generator rotates as the engine rotates, including when the engine is idling. In these vehicles, the engine is shut down to stop rotation and power generation of the generator. The engine is often used to power other vehicle components, such as a hydraulic steering system and other vehicle hydraulics, for example. As such, keeping the engine running when the vehicle is stopped facilitates operation of the hydraulics and the vehicle controllers powered by the generator.

Generator system components occasionally fail for various reasons. One type of failure is a phase-to-phase fault, which may include the presence of a short circuit between phases of the generator output. Continued generation of power by the generator when there is a phase-to-phase fault may create a safety hazard, such as, for example, overheating of the generator components and the DC bus.

According to an embodiment of the present disclosure, an electric vehicle is provided that includes a chassis, a ground engaging mechanism configured to support the chassis, an engine, and a generator driven by the engine. The generator is configured to generate electrical energy and to provide the electrical energy on a multi-phase output. The vehicle further includes a DC bus configured to receive electrical energy provided from the generator and a sensor configured to detect an energy level on the DC bus. The vehicle further includes a controller configured to control routing of electrical energy from the multi-phase output to the DC bus. The controller is configured to monitor the energy level on the DC bus based on the sensor. The controller includes fault management logic operative to determine the presence of a fault between phases of the multi-phase output based on a comparison of the energy level on the DC bus to a threshold energy level.

According to another embodiment of the present disclosure, a fault detection method is provided for a vehicle having an engine-driven generator. The method includes providing a vehicle having a chassis, an engine, a generator driven by the engine, and a DC bus. The generator is configured to provide electrical energy on a multi-phase output. The method includes routing electrical energy from the multi-phase output to the DC bus and monitoring an energy level of the DC bus. The method further includes determining the presence of a fault between phases of the multi-phase output based on the energy level of the DC bus. In one example, the monitoring of the energy level includes monitoring the voltage level on the DC bus, and the determining is based on a comparison of the voltage level on the DC bus to a threshold voltage level.

BRIEF DESCRIPTION OF THE DRAWINGS

The above-mentioned and other features and advantages of the invention, and the manner of attaining them, will become more apparent and the disclosure itself will be better understood by reference to the following description taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

The embodiments disclosed herein are not intended to be exhaustive or to limit the disclosure to the precise forms disclosed in the following detailed description. Rather, the embodiments are chosen and described so that others skilled in the art may utilize their teachings.

The term "logic" or "control logic" as used herein includes software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

Figure 1:
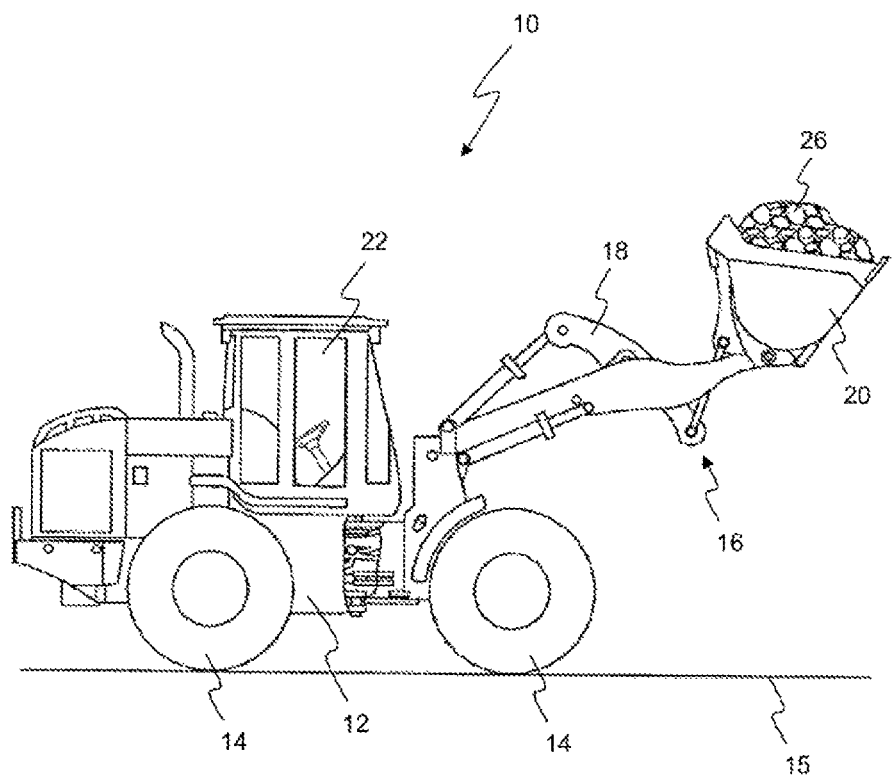
FIG. 1 illustrates an exemplary vehicle incorporating the fault detection system of the present disclosure.

Referring to FIG. 1, an exemplary utility vehicle in the form of a loader 10 is illustrated. Although the utility vehicle is illustrated and described herein as loader 10, the utility vehicle 10 may include a motor grader, a tractor, a bulldozer, a feller buncher, a crawler, an excavator, a skidder, a forwarder, or another utility vehicle. Further, power generation system and fault management logic of the present disclosure may be used with a non-utility vehicle, such as any vehicle including a generator and a DC bus. Loader 10 includes a chassis 12 and a ground engaging mechanism 14. Ground engaging mechanism 14 is capable of supporting chassis 12 and propelling chassis 12 across the ground 15. Although the illustrated loader 10 includes wheels as ground engaging mechanism 14, loader 10 may include other ground engaging mechanisms, such as steel tracks, rubber tracks, or other suitable ground engaging members.

Loader 10 further includes a loader assembly 16. As illustrated in FIG. 1, loader assembly 16 includes a loader boom 18 and a work tool 20 in the form of a bucket. Work tool 20, which may be hydraulically controlled, may be capable of moving, excavating, plowing, or performing other material handling functions on a load 26, such as dirt or other materials. Other suitable work tools include, for example, blades, pallet forks, bail lifts, augers, harvesters, tillers, mowers, and grapples. Loader boom 18 is configured to move relative to chassis 12 to move and operate work tool 20. An operator controls the functions of loader 10, including ground engaging mechanism 14 and loader assembly 16, from an operator station 22 supported by chassis 12.

Figure 2:
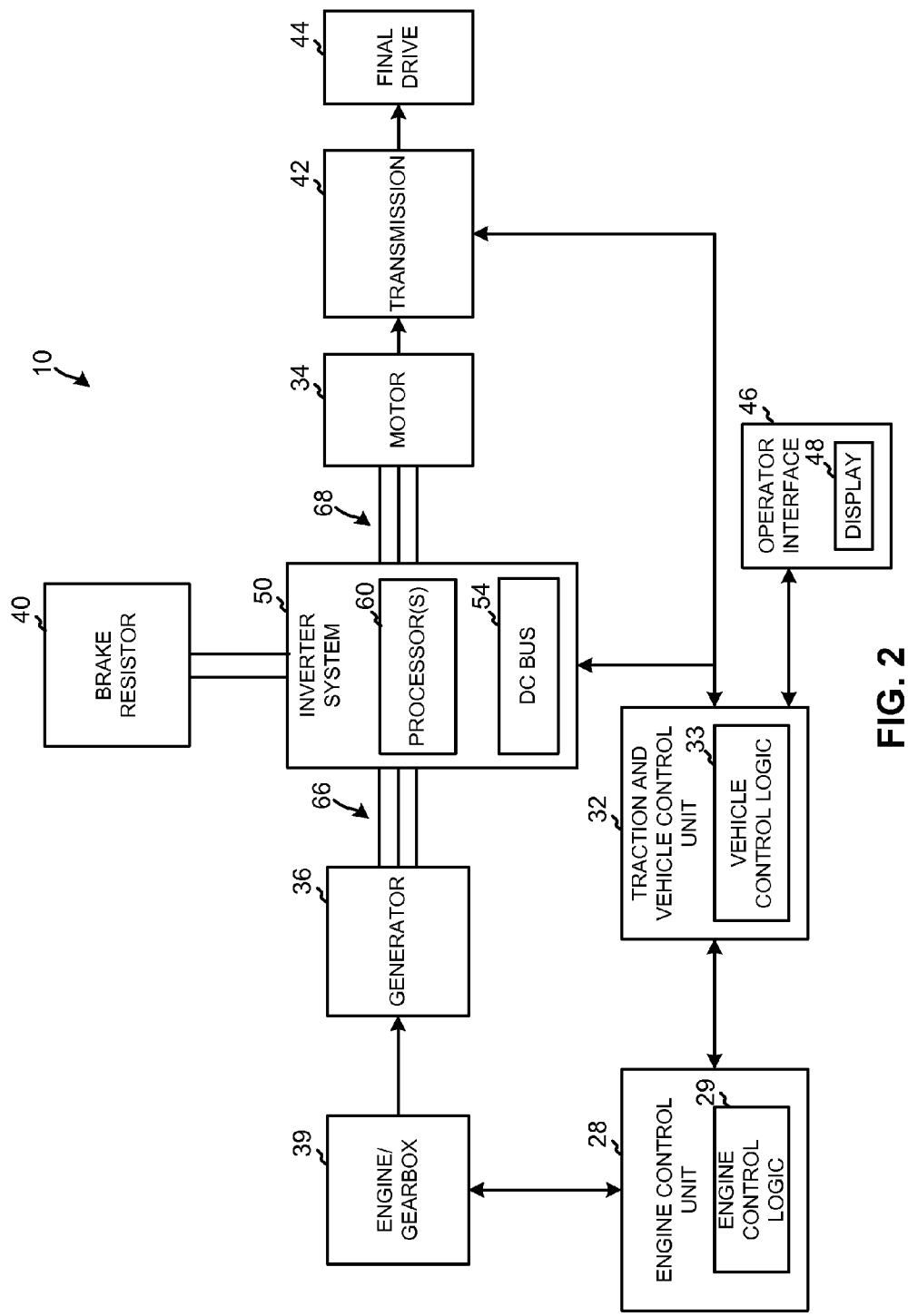
FIG. 2 illustrates a representative view of an exemplary electric drive system of the vehicle of FIG. 1.

Referring to FIG. 2, vehicle 10 includes an electric drive system having a controller 50 configured to control one or more electric machines. Controller 50 may include one or more control units for controlling the one or more electric machines. Controller 50 includes at least one processor 60 having internal or external memory accessible by the at least one processor 60. The at least one processor 60 executes instructions contained in software and/or firmware stored in the memory to perform the functionality of controller 50 described herein. In the illustrated embodiment, controller 50 is an inverter system 50 configured to control power generation from a generator 36 and to drive and/or control the loads connected to generator system output (e.g., DC bus 54). Exemplary loads controlled by inverter system 50 include a motor 34 and a brake resistor 40, although other suitable loads may be controlled. Additional or fewer electric machines may be controlled by inverter system 50. In the exemplary embodiment, inverter system 50 includes a dual inverter motor drive configured to drive motor 34 with the power provided with generator 36.

Motor 34 is configured to drive a transmission 42 and a final drive 44 (e.g., drive axle(s) coupled to ground engaging mechanisms 14) of vehicle 10. Additional motors 34 may be provided to drive one or more drive axles or ground engaging mechanisms 14 of vehicle 10. In one embodiment, vehicle 10 may not include a transmission 42, and the output of motor 34 may be coupled to final drive 44 for driving ground engaging mechanism 14. In one embodiment, motor 34 includes a permanent magnet direct current (PMDC) machine, switched reluctance machine, or other suitable electric machine. In one embodiment, generator 36 includes a permanent magnet machine.

Figure 3:
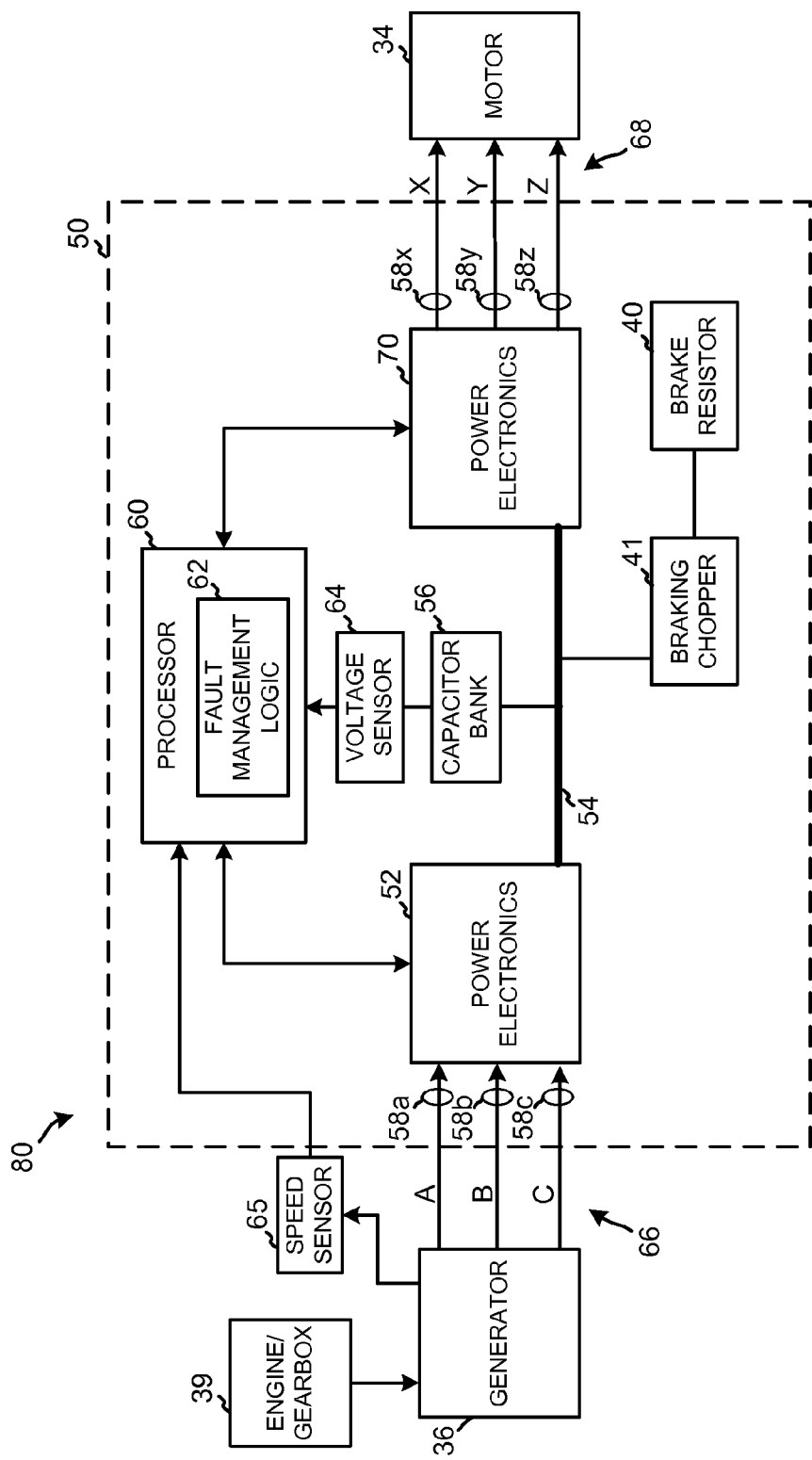
FIG. 3 illustrates a representative view of an exemplary power generation system of the vehicle of FIG. 1 including a generator, a controller, and a DC bus.

Generator 36 is coupled to a prime mover, illustratively an engine and gearbox assembly 39, and is configured to generate electrical power for use by vehicle 10. In particular, the rotation of engine 39 causes corresponding rotation of a rotor of generator 36, thereby generating electrical power through windings of generator 36. In one embodiment, engine 39 is a diesel engine, although other suitable engines may be used. Vehicle 10 includes an engine control unit (ECU) 28 in communication with a traction and vehicle control unit 32 for controlling engine 39. In particular, ECU 28 includes engine control logic 29 operative to control the speed and operation of engine 39 based on control signals provided with control unit 32. In one embodiment, an engine speed sensor is coupled to engine 39 for detecting the engine output speed and providing the detected engine speed to control unit 32 and/or to ECU 28. In one embodiment, speed sensor 65 of FIG. 3 is used to detect the engine speed.

Multi-phase electric power is generated by generator 36 and provided on a multi-phase output that routes the electric power to inverter system 50. In the illustrated embodiment, the multi-phase output includes multi-phase electrical lines 66, such as electrical cables or other suitable conductors, as well as three-phase circuitry within generator 36 and inverter system 50. In the illustrated embodiment, electrical lines 66 are three-phase electrical cables configured to route three-phase power from generator 36 to inverter system 50. Inverter system 50 is operative to rectify the three-phase electrical power received on the multi-phase output and to provide the rectified power onto a direct current (DC) bus 54, as described herein. Inverter system 50 is further operative to route power from DC bus 54 to one or more loads of vehicle 10, such as to motor 34, a brake resistor(s) 40, and/or other suitable loads. In an alternative embodiment, inverter system 50 may include another suitable energy storage device, such as a battery or fuel cell, for example, located internal or external to inverter system 50. As described in greater detail herein with respect to FIG. 3, inverter system 50 includes a processor 60 containing fault management logic 62 operative to detect and analyze faults with generator 36 and inverter system 50.

Traction and vehicle control unit 32 of vehicle 10 is in communication with inverter system 50 and ECU 28. Control unit 32 is operative to control the state of vehicle 10, control and communicate with devices of an operator interface 46, and issue commands to ECU 28 for controlling engine 39 and to inverter system 50 for controlling motor 34 and generator 36. Control unit 32, which includes a processor and software/firmware stored in memory accessible by the processor, includes vehicle control logic 33 operative to receive user input and monitored vehicle parameters for controlling various components and functionalities of vehicle 10 (e.g., transmission 42, traction control, engine control, etc.) and to communicate control and feedback signals with inverter system 50. A traction control unit and/or transmission control unit may alternatively be separate from and in communication with vehicle control unit 32. Other suitable configurations of control unit 32 may be provided.

Control unit 32 is further operative to issue electric machine commands to inverter system 50, and inverter system 50 controls motor 34 and generator 36 based on the received commands. In one embodiment, inverter system 50 provides vehicle parameters, such as motor and generator speed feedback, to control unit 32. In one embodiment, transmission 42 may include a speed sensor providing transmission speed feedback to control unit 32. In one embodiment, control unit 32 uses closed-loop controls for providing electric machine commands to inverter system 50 based on the received vehicle parameters (e.g., motor speed, generator speed, transmission speed, etc.).

In the illustrated embodiment, vehicle 10 further includes an operator interface 46 providing an operator with inputs, feedback, and controls for vehicle 10. For example, operator interface 46 is provided in operator station 22 (see FIG. 1) and may include a steering device, a brake, an accelerator, a transmission shifter, and other operator input devices. In the illustrated embodiment, one or more devices of operator interface 46 are in communication with control unit 32. In one embodiment, control unit 32 may receive operator inputs from operator interface 46 and provide controls and commands to the appropriate controller 28, 50 based on the received operator inputs. Operator interface 46 illustratively includes a display 48 that displays various vehicle parameters such as vehicle speed, ground speed, transmission gear data, temperature data, fault data, and other parameters provided with control unit 32. In one embodiment, display 48 also provides diagnostic information received from inverter system 50, ECU 28, and/or control unit 32. In one embodiment, control unit 32 issues motor and generator control commands to inverter system 50 and issues engine speed commands to ECU 28 over controller area network (CAN) communication. Other suitable communication protocols may be provided.

Referring to FIG. 3, engine 39, generator 36, and inverter system 50 provide a power generation system 80 for vehicle 10. In the illustrated embodiment, inverter system 50 includes power electronics 52 controlled by processor 60 to route three-phase electrical energy from generator 36 to DC bus 54. In one embodiment, a capacitor bank 56 is coupled to DC bus 54 to establish potential on DC bus 54. Capacitor bank 56, which includes one or more capacitors, further serves as an energy buffer to stabilize DC bus 54 at a predetermined voltage level. Processor 60 may control DC bus 54 to any suitable DC voltage level based on power electronics 52 and the activation and deactivation of loads. Power electronics 52 serve as a power converter (e.g., rectifier) for converting the AC power provided with generator 36 to DC power placed on DC bus 54. Inverter system 50 further includes power electronics 70 controlled by processor 60 to direct the power on DC bus 54 to motor 34 and/or to other loads based on controls from processor 60. In the illustrative embodiment, power electronics 52 receive AC power from generator 36 over three-phase power lines 66 and direct rectified DC power to capacitors 56. Power lines 66 illustratively include a first phase line A, a second phase line B, and a third phase line C. Similarly, power electronics 70 are operative to invert DC power on DC bus 54 and route the inverted power to motor 34 over three-phase power lines 68, such as electrical cables or other suitable conductors. Power lines 68 illustratively include a first phase line X, a second phase line Y, and a third phase line Z. Other suitable drivers may be used to route power to and from electric machines 34, 36.

Inverter system 50 further includes a braking chopper 41 or other suitable switch device that is controlled by processor 60 to selectively route power from DC bus 54 and/or motor 34 to brake resistor(s) 40. In one embodiment, braking chopper 41 is controlled to draw current or bleed energy from DC bus 54 to brake resistor 74, as described herein. Braking chopper 41 may be separate from or integrated with power electronics 70. In one embodiment, inverter system 50 routes excess energy generated from motor 34 to brake resistor 40 upon motor 34 reducing speed. Brake resistor 40 absorbs and dissipates received energy into heat.

In one embodiment, control unit 32 of FIG. 2 provides controls and other parameters to inverter system 50 for controlling power electronics 52, 70. In the illustrated embodiment, a voltage sensor 64 is coupled to capacitor bank 56 and/or DC bus 54 for providing a signal representative of measured voltage on DC bus 54 to processor 60. In one embodiment, power electronics 52, 70 include a plurality of power semiconductors, such as insulated-gate bipolar transistors (IGBT's) or MOSFET devices, for example, controlled by processor 60 and configured to control the flow of current provided with generator 36 to DC bus 54 and from DC bus 54 to motor 34 and brake resistor 40.

In one embodiment, each phase of power lines 66, 68 includes a current sensor 58 for measuring the current through the respective phases of power lines 66, 68. In particular, a current sensor 58a is coupled to first phase line A, a current sensor 58b is coupled to second phase line B, and a current sensor 58c is coupled to third phase line C. Similarly, a current sensor 58x is coupled to first phase line X, a current sensor 58y is coupled to second phase line Y, and a current sensor 58z is coupled to third phase line Z. In one embodiment, current sensors 58 provide feedback signals to processor 60 indicative of the measured current through the respective power line 66, 68. An exemplary current sensor 58 is an open loop Hall effect current transducer.

Fault management logic 62 of inverter system 50 of FIG. 3 is operative to detect and analyze faults associated with inverter system 50, generator 36, and motor 34. In the illustrated embodiment, fault management logic 62 is operative to detect a short circuit condition between phases of the three-phase output from generator 36 based on a monitored energy level of DC bus 54. Fault management logic 62 is further operative to monitor for an overcurrent condition on the three-phase output from generator 36.

Figure 4:
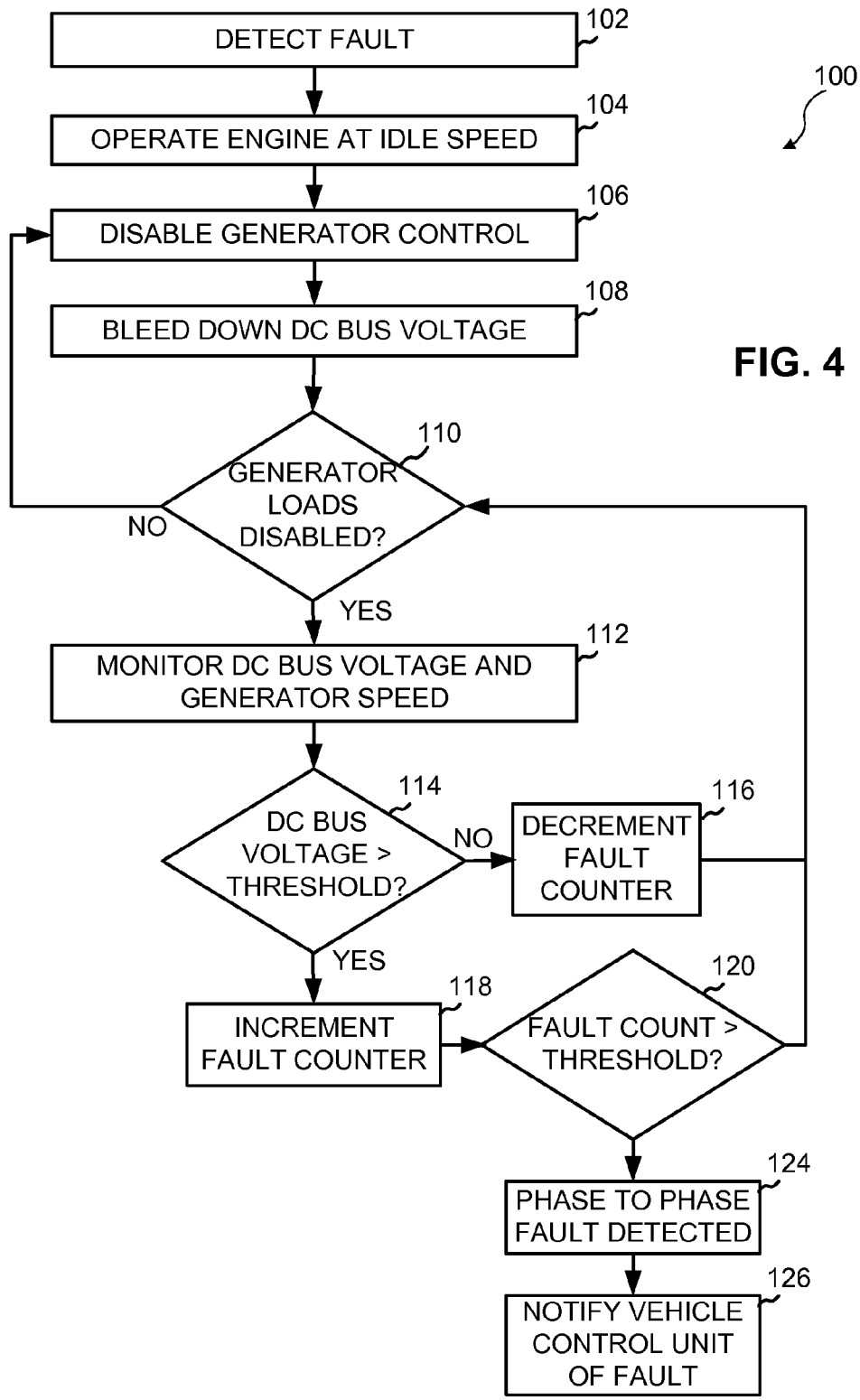
FIG. 4 illustrates a flow chart of an exemplary method of detecting a phase-to-phase fault of the power generation system of FIG. 3.

Referring to FIG. 4, a flow diagram 100 of an exemplary method performed by fault management logic 62 of inverter system 50 is illustrated for detecting and analyzing a fault associated with power generation system 80. Reference is made to FIGS. 1-3 throughout the description of FIG. 4. At block 102, during operation of engine 39, fault management logic 62 detects a fault with inverter system 50 and/or generator 36. In one embodiment, the detected fault is an overcurrent condition from the output of generator 36, although other suitable faults may be detected. In particular, fault management logic 62 monitors the current level on each power line 66 and determines an overcurrent condition upon the monitored current level exceeding a threshold current level stored in memory. Upon detection of the fault at block 102, fault management logic 62 causes engine 39 to operate at an idle speed. For example, fault management logic 62 issues a command signal to control unit 32 instructing that an overcurrent condition or other fault has been detected, and control unit 32 instructs ECU 28 to operate engine 39 at the idle speed or at another suitable low engine speed. An exemplary engine idle speed is 900 revolutions per minute (RPM), although other suitable idle speeds may be implemented. As such, both engine 39 and generator 36 are run at idle speed upon detection of the fault. In addition, fault management logic 62 disables the control of generator 36 at block 106 upon detection of the fault.

In one embodiment, disabling the control of generator 36 at block 106 involves opening all generator power semiconductors (e.g., IGBTs). In one embodiment, the motor load is disabled from inverter system 50 at block 106. In another embodiment, the motor load is not disabled and the motor 34 is run at reduced power with an uncontrolled DC bus 54. In one embodiment, upon detecting an asymmetric fault at block 102 wherein an IGBT/diode pair is shorted, one set of IGBTs is turned off and another set of IGBTs is turned on (depending on which IGBT is detected as shorted) to limit the fault current.

Fault management logic 62 monitors an energy level, illustratively the voltage (i.e., potential energy) level, on DC bus 54 with voltage sensor 64. Upon engine 39 being operated at low idle speed, fault management logic 62 bleeds down the voltage on DC bus 54, as represented at block 108. In the illustrated embodiment, fault management logic 62 bleeds down the DC bus voltage by activating braking chopper 41, thereby allowing the energy on DC bus 54 to dissipate to brake resistor 40. The DC bus voltage may be bled down using another suitable method or device. In one embodiment, braking chopper 41 is switched on at block 108 for a predetermined duration, such as one minute for example or another suitable duration, to allow the DC bus voltage to stabilize or reduce to a desired level. Alternatively, fault management logic 62 monitors the voltage level on DC bus 54 at block 108 after activating braking chopper 41, and fault management logic 62 deactivates braking chopper 41 once the monitored DC bus voltage has stabilized and/or returned to below a voltage level threshold.

At block 110, after the predetermined duration has passed and/or braking chopper 41 has been switched off, fault management logic 62 determines whether the generator loads are all disabled, including motor 34 and braking chopper 41, for example. In particular, fault management logic 62 verifies that the current to brake resistor 40 is close to or about zero amps (A) and that the motor control is disabled. If the loads are not disabled, the method returns to block 106 to disable the generator controls. If the loads are disabled at block 110, fault management logic 62 continues to monitor the voltage level on DC bus 54 with voltage sensor 64 and the speed of generator 36 with a speed sensor 65 (FIG. 3). Speed sensor 65 may include any suitable sensor operative to detect the rotational speed of generator 36 or engine 39. Based on the speed of generator 36, fault management logic 62 calculates an expected voltage level on DC bus 54 with all loads (e.g., motor 34, brake resistor 40, etc.) disabled. In one embodiment, the expected voltage level on DC bus 54 is calculated further based on an expected or estimated temperature of the generator permanent magnets and on the known geometry of generator 36. In one embodiment, the temperature is estimated or calculated using an electromagnet observer. In one example, an expected voltage level on DC bus 54 for a generator idle speed of 900 RPM at a particular generator magnet temperature is about 150 VDC. Other suitable expected voltage levels may be calculated based on the system configuration and generator speed and temperature. In one embodiment, fault management logic 62 adjusts the expected voltage level based on a detected change in the generator speed.

Based on the expected DC bus voltage level, fault management logic 62 determines a threshold voltage level for use in the comparison block 114 of FIG. 4. For example, the threshold voltage level of block 114 may be calculated by adding a voltage offset to the expected DC bus voltage level. In one example, a voltage threshold of 220 V is selected based on a calculated expected DC bus voltage of 150 V, although other suitable voltage thresholds may be selected based on system configuration.

In one embodiment, fault management logic 62 calculates the expected DC bus voltage and the voltage threshold at block 112 based on formulas stored in memory of processor 60. In other embodiments, a lookup table is stored in memory of inverter system 50 containing expected DC bus voltages that correspond to combinations of generator speed, magnet temperature, and generator geometry. Similarly, the lookup table may contain DC bus voltage thresholds that correspond to the expected DC bus voltages. As such, fault management logic 62 may look up and retrieve the DC bus voltage threshold and/or the expected DC bus voltage level in block 112. In other embodiments, the DC bus voltage threshold of block 114 is predetermined and stored in memory of inverter system 50.

At block 114, with the voltage threshold calculated, fault management logic 62 compares the monitored DC bus voltage (determined with voltage sensor 64) and the calculated voltage threshold. If the monitored DC bus voltage does not exceed the voltage threshold at block 114, fault management logic 62 decrements a fault counter at block 116 (or holds the fault counter at zero) and returns to block 110 to continue monitoring the DC bus voltage. If the monitored DC bus voltage exceeds the voltage threshold at block 114, fault management logic 62 increments the fault counter at block 118 and compares the fault counter to a counter threshold at block 120. If the fault counter exceeds the counter threshold at block 120, fault management logic 62 determines at block 124 that a phase-to-phase fault, i.e., a short circuit between phases of the three-phase generator output, exists in the system. Fault management logic 62 then issues a notification signal to control unit 32 to notify the control unit 32 that the phase-to-phase short circuit fault has been detected. In response to the fault notification signal, control unit 32 instructs ECU 28 to shut down engine 39. In the illustrated embodiment, control unit 32 first provides a warning to the operator that engine 39 will be shut down, and control unit 32 shuts down engine 39 after a suitable delay following the warning to the operator. As such, rotation of generator 36 is stopped to reduce the likelihood of driving energy into the faulted area of the system.

In the illustrated embodiment, the fault counter threshold of block 120 is programmed to provide a suitable delay after first detecting that the DC bus voltage exceeds the calculated voltage threshold at block 114. For example, a threshold counter of five requires that fault management logic 62 detect the DC bus voltage exceeding the voltage threshold for at least five iterations of the control loop. As such, the likelihood of a false analysis by fault management logic 62 is reduced. For example, fault management logic 62 is less likely to determine a fault exists due to a momentarily high or false voltage reading on DC bus 54.

While the voltage level on DC bus 54 is monitored and compared to a threshold in the illustrative embodiment, other suitable measures of energy on the DC bus 54 may be used to implement the method described herein. In one embodiment, the current level or other energy level may be monitored and compared with a threshold.

In one embodiment, control unit 32 issues a fault warning signal (e.g., audible or visual) to operator interface 46 to notify the operator of the phase-to-phase short circuit fault. The warning signal may warn the operator that engine 39 will be shut down. Alternatively, the warning signal may recommend that the operator manually shut down engine 39. In one embodiment, control unit 32 requires that the operator manually initiate the shutdown of engine 39 after issuance of the fault warning signal. In one embodiment, control unit 32 automatically initiates the shutdown of engine 39 following a predetermined delay after receiving the fault notification signal from fault management logic 62. An exemplary shutdown delay is one to five minutes, although any suitable delay may be implemented.

In one embodiment, fault management logic 62 exits the fault analysis method of FIG. 4 and returns to normal operation upon the generator controls being enabled (e.g., upon motor 34 being enabled) or upon the engine speed deviating a specified amount from the engine idle speed. For example, fault management logic 62 may exit the fault analysis method of FIG. 4 upon the engine speed deviating from the engine idle speed by ±10% or another suitable percentage. Upon exiting the fault analysis mode, the fault counter of blocks 116, 118 is cleared back to zero.

In the illustrated embodiment described with respect to FIG. 4, fault management logic 62 enters a fault analysis mode upon detecting a fault condition, such as an overcurrent condition or other fault, at block 102 to determine the cause of the fault condition. In an exemplary embodiment described herein, fault management logic 62 determines if a short circuit exists between phases of the three-phase generator output upon detection of an overcurrent fault. In particular, fault management logic 62 detects a phase-to-phase short circuit based on an elevated DC bus voltage. The elevated DC bus voltage may be due to, for example, flux strengthening of the generator magnets resulting from the fault current and voltage phase relationships. As such, fault management logic 62 is operative to initiate the shutdown of engine 39 upon a determination that the overcurrent fault is due to a phase-to-phase short circuit. However, other suitable causes of the overcurrent fault may be monitored and analyzed by fault management logic 62. For example, fault management logic 62 may detect failed sensors (e.g., current sensors 58, voltage sensor 64, etc.), damaged cables 66, 68, a short circuit or other circuit interruption in other areas of inverter system 50, or other suitable faults.

In one embodiment, fault management logic 62 monitors the DC bus voltage during other conditions of power generation system 80 in addition to the overcurrent condition or other fault condition. For example, fault management logic 62 may monitor for the phase-to-phase short circuit whenever engine 39 is idling and the generator loads are disabled or at other suitable operating conditions.

While fault management logic 62 is described herein as being provided in inverter system 50, fault management logic 62 may alternatively be located in vehicle control unit 32 or shared between inverter system 50 and vehicle control unit 32. Other suitable configurations of fault management logic 62 may be provided.

In another embodiment, fault management logic 62 detects a phase-to-phase fault of the three-phase generator output by monitoring for a ground fault. In this embodiment, the voltage system of vehicle 10 (e.g., provided with inverter system 50) is floating, i.e., not grounded to the frame or chassis 12. Fault management logic 62 monitors the resistance between the voltage system and chassis 12. If the resistance is below a predetermined resistance threshold, fault management logic 62 determines a fault exists. An exemplary fault detected with this method is the output phases of the generator being shorted to ground. Fault management logic 62 may implement a delay after initially detecting the low resistance before determining the fault exists.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. An electric vehicle including:
   a chassis;
   a ground engaging mechanism configured to support the chassis;
   an engine;
   a generator driven by the engine, the generator being configured to generate electrical energy and to provide the electrical energy on a multi-phase output;
   a DC bus configured to receive electrical energy provided from the generator;
   a sensor configured to detect an energy level on the DC bus; and
   a controller configured to control routing of electrical energy from the multi-phase output to the DC bus and to monitor the energy level on the DC bus based on the sensor, the controller including fault management logic operative to
   detect a fault condition, and
   determine that the fault condition is a phase-to-phase fault affecting relative distribution of the electrical energy on the phases of the multi-phase output based on a comparison of the energy level on the DC bus after detecting the fault condition to a threshold energy level.

2. The vehicle of claim 1, wherein the fault management logic is further operable to determine that the phase-to-phase fault includes a short circuit between phases of the multi-phase output.

3. The vehicle of claim 1, wherein the sensor is configured to detect a voltage level representative of the energy level, and the fault management logic determines that the fault condition is a phase-to-phase fault based on a comparison of the voltage level on the DC bus to a threshold voltage level.

4. The vehicle of claim 3, wherein the fault management logic determines that the fault condition is a phase-to-phase fault when the voltage level on the DC bus exceeds the threshold voltage level for a predetermined duration.

5. The vehicle of claim 1, wherein the fault management logic issues a command to shut down the engine upon determining that the fault condition is a phase-to-phase fault and determining that the energy level on the DC bus exceeds the threshold energy level.

6. The vehicle of claim 1, further including a current sensor configured to detect a current level of the multi-phase output, the fault management logic being operative to detect the fault condition by detecting an overcurrent condition based on the current sensor prior to determining that the fault condition is a phase-to-phase fault.

7. The vehicle of claim 6, wherein, upon detection of the overcurrent condition, the fault management logic is further operative to stabilize the DC bus voltage, and wherein the fault management logic is operative to determine that the fault condition is a phase-to-phase fault based on the comparison of the energy level on the DC bus following the stabilization of the DC bus voltage.

8. The vehicle of claim 1, wherein the fault management logic is operative to calculate the threshold energy level as an expected energy level on the DC bus based on a speed of the generator.

9. The vehicle of claim 1, further including an electric motor operative to drive the ground engaging mechanism, the controller selectively routing electrical energy from the DC bus to the electric motor to drive the motor, and wherein the fault management logic is operative to stabilize the DC bus voltage by controllably dissipating energy from the DC bus to an electric braking system of the ground engaging mechanism.

10. The vehicle of claim 1, wherein the engine is fixedly coupled to the generator such that rotation of the engine output shaft causes corresponding rotation of the generator.

11. The vehicle of claim 1, wherein the multi-phase output includes three-phase power conductors routed from the generator to the controller.

12. A fault detection method for a vehicle having a chassis, an engine, a generator driven by the engine, and a DC bus, the generator being configured to provide electrical energy on a multi-phase output, the method comprising:
   routing electrical energy from the multi-phase output to the DC bus;
   detecting a fault condition;
   monitoring an energy level of the DC bus after detecting the fault condition; and
   determining that the fault condition is a phase-to-phase fault affecting relative distribution of the electrical energy on the phases of the multi-phase output based on the energy level of the DC bus after detecting the fault condition.

13. A method for detecting and evaluating a fault condition in a vehicle, the vehicle including an engine, a generator driven by the engine, a power converter, a DC bus, and an electrical vehicle braking system, the generator being configured to provide electrical energy on a multi-phase output, and the power converter being configured to rectify the multi-phase output and provide a rectified power output to the DC bus, the method comprising:
   detecting a current level on at least one phase of the multi-phase output;
   comparing the detected current level to a threshold current to detect an overcurrent fault condition;
   stabilizing the DC bus voltage in response to detecting the overcurrent fault condition by reducing a speed of the generator driven by the engine and controllably dissipating energy from the DC bus to the electrical vehicle braking system;

determining a voltage threshold based on the speed of the generator after stabilizing the DC bus voltage; and determining that the overcurrent fault condition is caused a short-circuit between phases of the multi-phase output based on a comparison of the stabilized DC bus voltage to the determined voltage threshold.

14. The fault detection method of claim 12, further comprising stabilizing the energy level of the DC bus in response to detecting the fault condition, and wherein determining that the fault condition is a phase-to-phase fault includes determining that the fault condition is a phase-to-phase fault based on the energy level of the DC bus after stabilizing the energy level of the DC bus.

15. The method of claim 14, wherein monitoring the energy level of the DC bus includes monitoring a voltage level on the DC bus using a voltage sensor after stabilizing the energy level of the DC bus, and wherein determining that the fault condition is a phase-to-phase fault based on the energy level of the DC bus after stabilizing the energy level of the DC bus includes determining a threshold voltage level indicative of an expected voltage level on the DC bus based on a speed of the generator after stabilizing the energy level of the DC bus, and comparing the voltage level on the DC bus after stabilizing the energy level of the DC bus to the threshold voltage level.

16. The fault detection method of claim 14, wherein stabilizing the energy level of the DC bus includes controllably dissipating energy from the DC bus to a braking system of the vehicle.

17. The fault detection method of claim 14, wherein stabilizing the energy level of the DC bus includes slowing a speed of the generator.

* * * * *